United States Patent [19]

Hauser et al.

[11] 4,033,781

[45] July 5, 1977

[54] FIBER REINFORCED STRUCTURAL MATERIAL

[75] Inventors: Karl V. Hauser, Ann Arbor, Mich.; Edwin W. Ronsaville, Jr., Annapolis, Md.

[73] Assignees: Amtech, Inc., Odenton, Md.; Edward C. Levy Company, Detroit, Mich. ; part interest to each

[22] Filed: Jan. 9, 1976

[21] Appl. No.: 647,883

[52] U.S. Cl. .................................. 106/90; 106/99; 260/42.13
[51] Int. Cl.² .......................................... C04B 7/35
[58] Field of Search ................ 106/90, 99; 52/659; 260/42.13

[56] References Cited

UNITED STATES PATENTS

| | | | |
|---|---|---|---|
| 2,677,955 | 5/1954 | Constantinesco | 106/99 |
| 3,429,094 | 2/1969 | Romualdi | 106/99 |
| 3,650,785 | 3/1972 | Ball et al. | 106/90 |
| 3,679,445 | 7/1972 | Howe | 106/99 |

*Primary Examiner*—J. Poer
*Attorney, Agent, or Firm*—Harness, Dickey & Pierce

[57] ABSTRACT

A formable matrix used as structural material and having an admixture of reinforcing non-metallic fibers to control deterioration and improve flexural strength. The fibers are fabricated with a cross section which provides a maximum ratio of surface to cross-sectional areas and increased frictional forces between fiber and matrix when the fiber is stressed. The disclosed embodiment of the fibers has a cross-sectional shape with a plurality of arms extending radially from the center, preferably with lobes formed at their outer ends.

6 Claims, 3 Drawing Figures

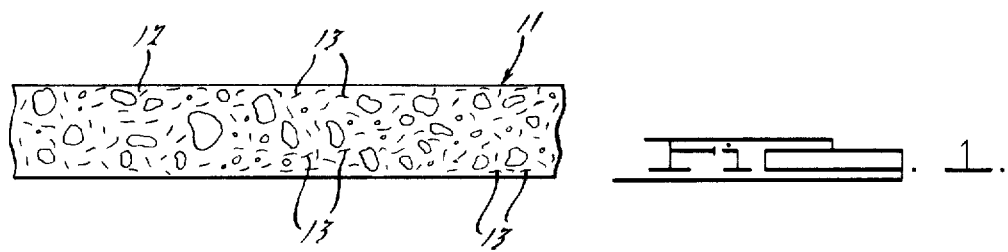
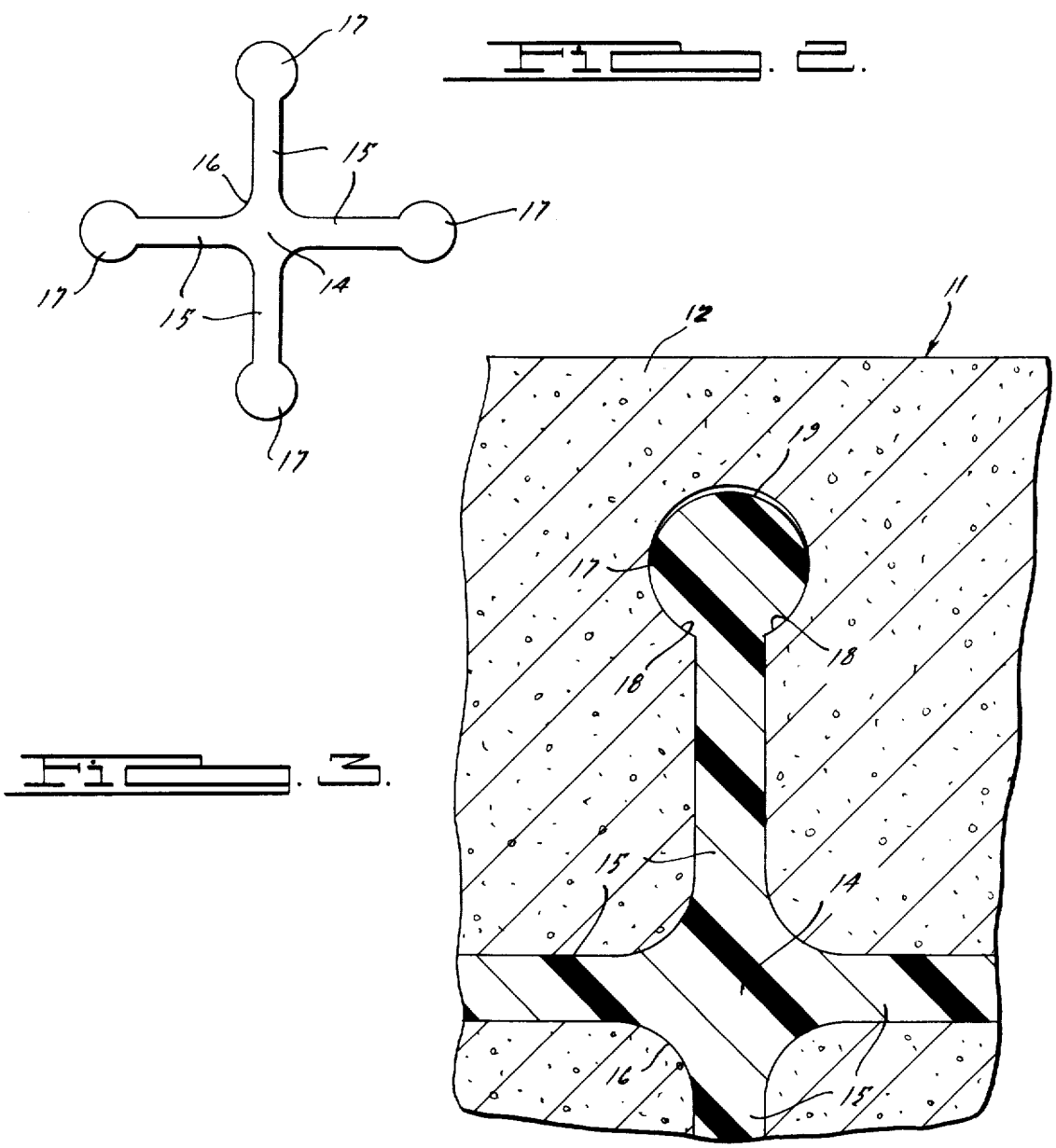

FIBER REINFORCED STRUCTURAL MATERIAL

BACKGROUND OF THE INVENTION

1. Field of the Invention

The invention is concerned with non-metallic fiber reinforcement of formable matrices used as structural material, such as concrete, plaster, and sand-lime mixtures. It is particularly concerned with controlling the deterioration of such structural materials by alternate freezing and thawing, as well as improvement in flexural strength.

2. Description of the Prior Art

The relative weakness of certain hydraulic setting matrices used as structural materials is well known. For example, concrete is strong in compression but relatively weak in tension and therefore in flexure. It is common for this reason to use steel reinforcement in concrete, and prestressing or post-stressing of the steel places the concrete in compression to counteract flexural or tension loading.

Freeze-thaw cycles cause disruption of concrete for the same reason. Freezing of minute particles of ice inside the concrete cause tensile forces which are in excess of its ability to withstand, causing portions (near the surface particularly) to spall.

It is known to admix fibers with the matrix to counteract these drawbacks. Among disclosures of steel or wire admixed fibers are the following:

Romualdi — U.S. Pat. No. 3,429,094
Ball et al. — U.S. Pat. No. 3,650,785
National Standard Co., Technical Data Bulletin No. SWT-114, September, 1970.

The use of wire or steel fibers is unsatisfactory for several reasons. Steel has low elongation even at high tensile stresses and the fibers are likely to slip within the matrix when the structural member is subjected to loads. In addition to the relative stiffness and lack of workability of steel, it is relatively heavy and therefore costly to achieve a given proportionate volume within the matrix.

The use of non-metallic fibers admixed in matrices for strengthening purposes is equally well known. Examples of patents disclosing such compositions are the following:

Jarboe — U.S. Pat. No. 3,044,547
Shannon — U.S. Pat. No. 3,147,127
Fischer et al. — U.S. Pat. No. 3,533,203
Zonsveld — U.S. Pat. No. 3,591,395
Goldfein — U.S. Pat. No. 3,645,961
Howe — U.S. Pat. No. 3,679,445
Kempster — U.S. Pat. No. 3,716,386
Kurtz — U.S. Pat. No. 3,769,052

A characteristic of these fibers which creates a drawback is that under stress they begin to stretch, and in stretching their diameter shrinks. By shrinking, the fibers may lose their bond with respect to the matrix. This sequence causes rapid progressive failure when the yield strength of the composite fiber-matrix mixture is reached.

The same would be true of conventional reinforcing rod, except that it is preformed before use to provide mechanical connections with the matrix that persist regardless of shrinkage in cross section. This is not possible with previous extruded fibers which are merely cut off clean. A deformed fiber, such as some of the available metal ones or others (see National Standard Co. Specification No. SWT-114 and Howe U.S. Pat. No. 3,679,445) which have intermittent flattened or twisted sections, or crimped, hammered or tapered profiles, does not counteract this drawback. Other patents in this same general area discovered while conducting searches on the subject matter of this invention are the following:

Fischer et al. — U.S. Pat. No. 3,208,838
Kjell-Berger — U.S. Pat. No. 3,217,075
Hull et al. — U.S. Pat. No. 3,466,822
Gothard et al. — U.S. Pat. No. 3,637,457
Campbell — U.S. Pat. No. 3,676,968

The co-pending application of Terence M. Shaw, Ser. No. 554,162, filed Feb. 28, 1975 and assigned to the assignee of the present application now Pat. No. 3,980,484, shows a fiber reinforced structural material in which the fibers have enlarged knob-like ends serving as anchors to enhance the bonding action between the fibers and the matrix. Karl V. Hauser's co-pending application Ser. No. 513,321, filed Oct. 9, 1974, now abandoned, shows another fiber reinforced structural material in which each fiber is so curved that the matrix, under stress, will exert forces in different directions along its length. Fibers with the cross-sectional shape shown in this application have been used for paintbrush bristles for the purpose of obtaining more paint-carrying capacity. The present invention is believed patentable over these prior disclosures, as well as over the references cited in the co-pending Hauser application.

BRIEF SUMMARY OF THE INVENTION

It is an object of the present invention to overcome the disadvantages of the previous fiber-matrix compositions described above, and to provide a material which combines the advantages of low-cost and high-elongation fibers with a firm bonding of the fibers to the matrix, whereby the flexural strength and freeze-thaw characteristics of the resulting structure will be greatly enhanced.

It is another object to provide a method of manufacturing such structural material which is economical, efficient and well-suited to mass production.

Briefly, the structural material of this invention comprises a hardenable matrix and a plurality of randomly arranged fibers admixed in said matrix, said fibers being fabricated of a non-metallic substance, the fibers as a group extending in all directions in the formed and set matrix, the fibers being fabricated of a cross section which provides a maximum ratio of surface area to cross-sectional area.

BRIEF DESCRIPTION OF THE DRAWINGS

FIG. 1 is a side elevational view of a portion of a structural member formed in accordance with the invention;

FIG. 2 is an enlarged cross-sectional view of a single fiber; and

FIG. 3 is an enlarged fragmentary and partly schematic cross-sectional view showing the manner in which the lobes at the ends of the fiber arms are wedged against the matrix when the fiber is stretched.

DESCRIPTION OF THE PREFERRED EMBODIMENT

Referring to FIG. 1, the structural material of this invention is generally indicated at 11 and comprises a formable and hardenable matrix 12 and a plurality of randomly admixed fibers 13. The matrix is preferably shown in FIG. 1 as being concrete but the invention applies equally well to other hydraulic-setting matrices, such as plaster and sandlime mixtures.

Reinforcing fibers 13 may be fabricated of a polymer or other non-metallic meltable substance. For use in concrete as a matrix, preferable materials are nylon and polypropylene which have resistance to the alkaline environment. Other substances which may be used to fabricate fibers 13 are Dacron, polycarbonate, acetate, rayon, Saran, acrylic fiber, fiberglass, polyethylene, polyolefin, polyvinylidene chloride, polyester, and Orlon.

The lengths of fibers 13 may be varied to suit requirements, typical lengths being 1 or 2 inches. The proportion of fibers to matrix is such as to obtain the desired strength characteristics, taking into account cost considerations. A typical fiber concentration would be two percent by volume in a concrete matrix. The fibers are admixed in the unset matrix by proper techniques which will prevent clumping or clinging of the fibers and insure a uniform random admixture through the entire matrix, the fibers as a group extending in all directions in the formed and set matrix.

The fibers are fabricated with a cross section which provides a maximum ratio of surface area to cross-sectional area. Furthermore, in the preferred embodiment, the cross section is such as to provide increased frictional forces at points between the fiber and matrix when the fiber is stressed. Both of these features enhance the surface bond between fiber and matrix which is the inherent weak point of such reinforced matrices.

As shown in FIG. 2, the cross section of fiber 13 has a central area 14 and four arms 15 extending substantially radially from the central area. The arms are shown as being equidistantly spaced from each other, of equal thickness and with parallel sides. Fillets 16 may be formed between adjacent arms 15. Lobes 17, shown as rounded enlargements, are formed at the outer ends of arms 15.

The tensile strength of such a fiber is directly related to its cross-sectional area, and its bond to the matrix 12 is directly related to the surface area in contact with the matrix. The above-described multi-armed and lobal formation provides a ratio of surface area to cross-sectional area which is much higher than that of the common circular cross section fiber extrusions.

In addition, when such a fiber is stressed during use of the structural member 11, the cross section shrinks. In the present instance, as see in in FIG. 3, this shrinkage will tend to displace each of the lobes 17 toward the center 14 of the fiber. This will provide a wedging force in the areas 18 where the inwardly facing surface portions of each lobe contact matrix 12. The bond between the facing fiber and matrix surfaces will thus be strengthened at these points, offsetting at least to some degree the loss of bond at the outer portion 19 of the lobe surface.

Fibers according to the present invention could be economically manufactured by an extrusion process, with the ends cut off clean. Typically, with a 2 -inch fiber length, the distance between the outer ends of oppositely facing lobes 17 could be 0.018 inch Depending on the cross-sectional configuration, this could provide a total fiber cross-sectional area equivalent to the area of a round cross-sectional fiber having a 0.01 inch diameter.

The invention provides a relatively high fiber-to-matrix bond per unit weight of admixed fibers. Since this bond, rather than fiber tensile strength, is the critical factor in such reinforced matrices, and in view of the practical limitations on permissible admixed fiber weight in a given matrix, the invention results in a highly efficient use of materials.

The following flexural strength and freeze-thaw cycle tests show the advantages of a concrete matrix made according to the invention as compared with a similar matrix without the admixture of the reinforcing fibers.

TEST NO. 1

A mixture was made with the following ingredients:
44.0% 2NS Sand
15.0% Type I Cement
8.5% Water
32.5% Pea Pebbles Fibers were provided which were fabricated of polypropylene having a cross-sectional shape shown in FIG. 2, with an overall diameter of 0.0118 inch and a length of 2 inches. The material of the reinforcing fibers had a specific gravity of 0.90 (ASTM Test Method No. D-792 ), a softening point of 300° to 310° F (No. D-1525-65T) and a melting point of 325° to 350° F (No. D-2117-64 ). The fibers were 0.4% by weight of the mixture (0.6% by weight of the mortar portion excluding the pea pebbles).

Four specimens were fabricated, two with fibers and two without. For all four specimens, the water, cement and sand were mixed for one minute. For the two specimens with fibers, the fibers were added at this point and mixed for one-half minute. The coarse aggregate was then mixed in until the mix was uniform. Molding was accomplished by vibrating in two lifts in 2 -inch by 2 -inch by 12 -inch prism molds. The surface was trowelled. The specimens were cured 1 day in the mold and the balance in 70° F, 100% relative humidity ambient conditions. One specimen of each type was cured for a total of seven days and the other for 28 days. With a standard ASTM flexure test, the results were as follows:

| Cure Time | Flexure Stress, p.s.i. | | % Improvement |
|---|---|---|---|
| | With Fiber | Without Fiber | |
| 7 days | 938 | 782 | 19 |
| 28 days | 1120 | 1010 | 10 |

TEST NO. 2

The broken 28-day cured specimens were trimmed to form four 2 -inch by 2 -inch by 2 -inch specimens for the freeze-thaw test, two specimens being with fibers and two without. The specimens were immersed in a 10% saline solution for the accelerated freeze-thaw test. The results were as follows, expressed as percent of weight loss:

| Specimen | | No. of Freeze-Thaw Cycles | | | |
|---|---|---|---|---|---|
| | | 5 | 10 | 15 | 20 |
| 0.4% By Weight 2" Fibers | 1st test | 0 | 0.6 | 1.4 | 4.8 |
| | 2nd test | 0 | 0 | 1.3 | 4.7 |
| | Average | 0 | 0.3% | 1.35% | 4.75% |
| No Fibers | 1st test | 0 | 4.2 | 39.2 | 87.1 |
| | 2nd test | 0 | 0.4 | 53.8 | 100.0 |
| | Average | 0 | 2.3% | 47.0% | 93.5% |

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

We claim:

1. A structural material comprising a hardenable hydraulic-setting matrix and a plurality of randomly arranged elongated elements admixed in said matrix, said elements being fabricated of a non-metallic substance, the elements as a group extending in all directions in the formed and set matrix, each element having a cross section with a central area and a plurality of arms extending outwardly from said area, each element cross section being further provided with lobes on the outer ends of said arms.

2. A structural material according to claim 1 there being four equidistantly spaced arms.

3. A structural material according to claim 1 there being four equidistantly spaced arms, and fillets formed between adjacent arms.

4. A structural material according to claim 3 said arms having lobes at their outer ends, the elements being approximately two inches in length, the distance between the outsides of opposite lobes being approximately 0.018 inch.

5. A structural material according to claim 4 in which said elements are fabricated of polypropylene.

6. A structural material according to claim 4, said matrix being concrete, said elements constituting approximately 0.6% by weight of the mortar portion of the mixture.

* * * * *